United States Patent
Nobu

(10) Patent No.: US 11,965,593 B2
(45) Date of Patent: Apr. 23, 2024

(54) DAMPING PRESSURE SUPPLY CIRCUIT FOR PULLEY PRESSURE CONTROL VALVE

(71) Applicants: JATCO Ltd, Fuji (JP); NISSAN MOTOR CO., LTD., Yokohama (JP)

(72) Inventor: Hisao Nobu, Hachioji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/042,341

(22) PCT Filed: Sep. 21, 2021

(86) PCT No.: PCT/JP2021/034558
§ 371 (c)(1),
(2) Date: Feb. 21, 2023

(87) PCT Pub. No.: WO2022/091638
PCT Pub. Date: May 5, 2022

(65) Prior Publication Data
US 2023/0323945 A1    Oct. 12, 2023

(30) Foreign Application Priority Data
Nov. 2, 2020   (JP) ................................. 2020-183956

(51) Int. Cl.
| | |
|---|---|
| *F16H 61/662* | (2006.01) |
| *F15B 13/02* | (2006.01) |
| *F16H 9/18* | (2006.01) |
| *F16H 45/02* | (2006.01) |

(52) U.S. Cl.
CPC ......... *F16H 61/662* (2013.01); *F15B 13/026* (2013.01); *F16H 9/18* (2013.01); *F16H 45/02* (2013.01); *F16H 2045/0215* (2013.01)

(58) Field of Classification Search
CPC .......... F16H 61/662; F16H 9/18; F16H 45/02; F16H 61/0021; F16H 2059/683
USPC .......................................................... 474/28
See application file for complete search history.

(56) References Cited

U.S. PATENT DOCUMENTS

| | | | | |
|---|---|---|---|---|
| 4,764,156 | A | * | 8/1988 | Ohkumo ........... F16H 61/66259 477/906 |
| 4,781,655 | A | * | 11/1988 | Tezuka .................... F16H 61/66 477/45 |
| 4,948,370 | A | * | 8/1990 | Yamada ............ F16H 61/66259 477/46 |

(Continued)

FOREIGN PATENT DOCUMENTS

WO    WO-2016/006356 A1    1/2016

*Primary Examiner* — Henry Y Liu
(74) *Attorney, Agent, or Firm* — Foley & Lardner LLP

(57) ABSTRACT

A hydraulic control circuit includes a pressure regulator valve, a first pilot valve, a second pilot valve, and a third pilot valve. A first pilot pressure is introduced as a source pressure into the primary solenoid valve that generates a primary signal pressure and a secondary solenoid valve that generates a secondary signal pressure. A second pilot pressure is introduced as a source pressure into a lock-up solenoid valve that generates the lock-up signal pressure. A third pilot pressure is introduced as a damping pressure into a primary regulator valve that controls a primary pulley pressure according to the primary signal pressure, and into a secondary regulator valve that controls a secondary pulley pressure according to the secondary signal pressure.

3 Claims, 2 Drawing Sheets

(56) References Cited

U.S. PATENT DOCUMENTS

| | | | | |
|---|---|---|---|---|
| 5,113,718 A * | 5/1992 | Sato | | B60W 10/10 180/197 |
| 5,273,492 A * | 12/1993 | Kashiwase | | F16H 57/0434 474/43 |
| 5,980,420 A * | 11/1999 | Sakamoto | | F16H 37/086 477/50 |
| 6,829,528 B1 * | 12/2004 | Kang | | F16H 61/66259 701/61 |
| 2003/0155200 A1 * | 8/2003 | Moorman | | F16H 61/143 192/3.51 |
| 2003/0158009 A1 * | 8/2003 | Berger | | F16H 61/66272 475/116 |
| 2004/0063537 A1 * | 4/2004 | Shimada | | B60W 10/107 477/44 |
| 2004/0133318 A1 * | 7/2004 | Kang | | F16H 61/12 701/33.9 |
| 2005/0215393 A1 * | 9/2005 | Shimoda | | F16H 61/66259 477/44 |
| 2005/0251315 A1 * | 11/2005 | Tanaka | | F16H 61/12 701/51 |
| 2006/0063641 A1 * | 3/2006 | Oshita | | F16H 61/66259 477/44 |
| 2006/0069486 A1 * | 3/2006 | Yamaguchi | | F16H 61/66259 701/56 |
| 2006/0105868 A1 * | 5/2006 | Moorman | | F16H 61/66259 474/18 |
| 2006/0111208 A1 * | 5/2006 | Hiramatsu | | F16H 55/56 474/18 |
| 2006/0194671 A1 * | 8/2006 | Katou | | F16H 61/66272 477/46 |
| 2007/0082769 A1 * | 4/2007 | Nihei | | F16H 61/66272 474/8 |
| 2007/0093356 A1 * | 4/2007 | Izumi | | F16H 61/66272 477/45 |
| 2007/0099754 A1 * | 5/2007 | Yamaguchi | | F16H 61/66259 477/44 |
| 2007/0142142 A1 * | 6/2007 | Yamaguchi | | F16H 61/66272 474/18 |
| 2007/0184936 A1 * | 8/2007 | Nakayama | | F16H 61/66272 477/44 |
| 2007/0232423 A1 * | 10/2007 | Katou | | F16H 61/66272 474/18 |
| 2008/0146409 A1 * | 6/2008 | Yamaguchi | | F16H 61/66259 477/44 |
| 2008/0146410 A1 * | 6/2008 | Inoue | | F16H 61/66259 477/44 |
| 2009/0011888 A1 * | 1/2009 | Kawahigashi | | F16H 61/66272 475/127 |
| 2009/0082172 A1 * | 3/2009 | Mori | | F16H 61/66272 477/46 |
| 2010/0191407 A1 * | 7/2010 | Tanaka | | F16H 61/12 701/31.4 |
| 2010/0248874 A1 * | 9/2010 | Katou | | F16H 61/66272 474/28 |
| 2012/0244974 A1 * | 9/2012 | Tsuji | | F16H 55/56 474/28 |
| 2012/0244993 A1 * | 9/2012 | Ishida | | F16H 61/66259 477/39 |
| 2014/0343810 A1 * | 11/2014 | Suzuki | | F16H 61/0265 701/60 |
| 2014/0371012 A1 * | 12/2014 | Moriyama | | F16H 61/0021 60/413 |
| 2015/0075360 A1 * | 3/2015 | Takahashi | | F16H 61/06 91/361 |
| 2015/0148157 A1 * | 5/2015 | Takahashi | | F16H 61/66272 474/23 |
| 2016/0290501 A1 * | 10/2016 | Miyake | | F16H 61/662 |
| 2016/0290503 A1 * | 10/2016 | Kawamoto | | F16H 61/0021 |
| 2016/0356380 A1 * | 12/2016 | Hashimoto | | F16H 61/66272 |
| 2017/0002924 A1 * | 1/2017 | Honma | | F16H 61/66272 |
| 2017/0152924 A1 * | 6/2017 | Tsuji | | F16H 9/18 |
| 2017/0204970 A1 | 7/2017 | Honma et al. | | |
| 2018/0079418 A1 * | 3/2018 | Iwasa | | B60L 50/16 |
| 2018/0080550 A1 * | 3/2018 | Iwasa | | F16H 61/662 |
| 2018/0142783 A1 * | 5/2018 | Takahashi | | F16H 61/0021 |
| 2018/0245685 A1 * | 8/2018 | Kawasumi | | F16H 61/143 |
| 2018/0335134 A1 * | 11/2018 | Ohgata | | F16H 61/66272 |
| 2019/0242475 A1 * | 8/2019 | Washio | | F16H 61/6625 |
| 2019/0249756 A1 * | 8/2019 | Washio | | F16H 3/728 |
| 2019/0249768 A1 * | 8/2019 | Kishi | | F16H 61/02 |
| 2019/0249774 A1 * | 8/2019 | Ikeda | | F16H 59/40 |
| 2019/0270381 A1 * | 9/2019 | Washio | | B60K 17/06 |
| 2019/0309805 A1 * | 10/2019 | Kamijo | | F02D 41/022 |
| 2020/0032900 A1 * | 1/2020 | Tokoi | | F16H 61/66272 |

\* cited by examiner

DAMPING PRESSURE SUPPLY CIRCUIT FOR PULLEY PRESSURE CONTROL VALVE

TECHNICAL FIELD

The present invention relates to a damping pressure supply circuit for a pulley pressure control valve.

BACKGROUND ART

FIG. 2 of Patent Document 1 discloses a hydraulic circuit diagram schematically showing an inside of a control valve unit of a continuously variable transmission. In Patent Document 1, as shown in FIG. 2, a pilot valve (25) is provided on an oil passage (402) branched from an oil passage (401), and the pilot valve (25) generates a predetermined pressure set in advance according to a line pressure and outputs the predetermined pressure to a pilot pressure oil passage (403). Thus, a source pressure of signal pressures output from a line pressure solenoid valve (30), a clutch pressure solenoid valve (31), a lock-up solenoid valve (32), a primary solenoid valve (33), and a secondary solenoid valve (34) is generated.

PRIOR ART DOCUMENT

Patent Document

Patent Document 1: WO2016/006356 A1

SUMMARY OF INVENTION

As an improvement to the hydraulic circuit described above, it is conceivable to add another pilot valve. By reducing pressure in two steps with the two pilot valves, two types of pilot pressures, a low pressure and a high pressure, can be generated.

In this case, it is conceivable to use the two types of the pilot pressures for each solenoid valve. Specifically, it is conceivable that the high pilot pressure is used as the source pressure of the line pressure solenoid valve, the clutch pressure solenoid valve, the primary solenoid valve, and the secondary solenoid valve, and the low pilot pressure is used as the source pressure of the lock-up solenoid valve. Further, it is conceivable that the low pilot pressure is introduced as a damping pressure into a regulator valve, that is, a pulley pressure control valve, for controlling a primary pulley pressure and a secondary pulley pressure.

However, in a case where the low pilot pressure is equal to or higher than a lower limit of a set range of the line pressure, the two pilot valves both output the line pressure as the pilot pressure when the line pressure is equal to or lower than the low pilot pressure. That is, in this case, the low pilot pressure becomes the line pressure.

Therefore, in this case, oscillations in the line pressure, that is, repeated up and down fluctuations in the line pressure, may become oscillations in the damping pressure of the pulley pressure control valve, possibly resulting in fluctuations in the primary pulley pressure and secondary pulley pressure.

Further, in the lock-up solenoid valve, when the pilot pressure serving as the source pressure becomes lower, a use range of the signal pressure becomes narrower. Therefore, a too low setting of the low pilot pressure may result in poor controllability of the lock-up clutch and cause occurrence of engagement shock.

The present invention has been made in view of such a problem, and has an object to ensure the controllability of the lock-up clutch and damping performance of the pulley pressure control valve.

A damping pressure supply circuit for a pulley pressure control valve according to a certain aspect of the present invention includes a pressure regulator valve that regulates a pressure of oil discharged from an oil pump to a line pressure, a first pilot valve that generates a first pilot pressure with the line pressure as a source pressure, a second pilot valve that generates a second pilot pressure with the first pilot pressure as a source pressure, and a third pilot valve that generates a third pilot pressure with the second pilot pressure as a source pressure. The first pilot pressure is introduced as a source pressure into a primary solenoid valve that generates a primary signal pressure that is a signal pressure for controlling a primary pulley pressure in a belt continuously variable transmission and a secondary solenoid valve that generates a secondary signal pressure that is a signal pressure for controlling a secondary pulley pressure in the belt continuously variable transmission. The second pilot pressure is introduced as a source pressure into a lock-up solenoid valve that generates a signal pressure for controlling a lock-up pressure in a lock-up clutch of a torque converter. The third pilot pressure is introduced as a damping pressure into a primary pulley pressure control valve that controls the primary pulley pressure according to the primary signal pressure and a secondary pulley pressure control valve that controls the secondary pulley pressure according to the secondary signal pressure.

According to the above aspect, the third pilot pressure is generated by using the second pilot pressure, which is made to function as the source pressure of the lock-up solenoid valve, as the source pressure, and the third pilot pressure is made to function as the damping pressure of the pulley pressure control valve. Therefore, it is possible to set the third pilot pressure to be lower than the lower limit of the set range of the line pressure while setting the second pilot pressure to an appropriate level. Therefore, the controllability of the lock-up clutch and the damping performance of the pulley pressure control valve can be ensured.

DESCRIPTION OF EMBODIMENTS

The following will describe the embodiments of the present invention with reference to the accompanying drawings.

Figure 1:
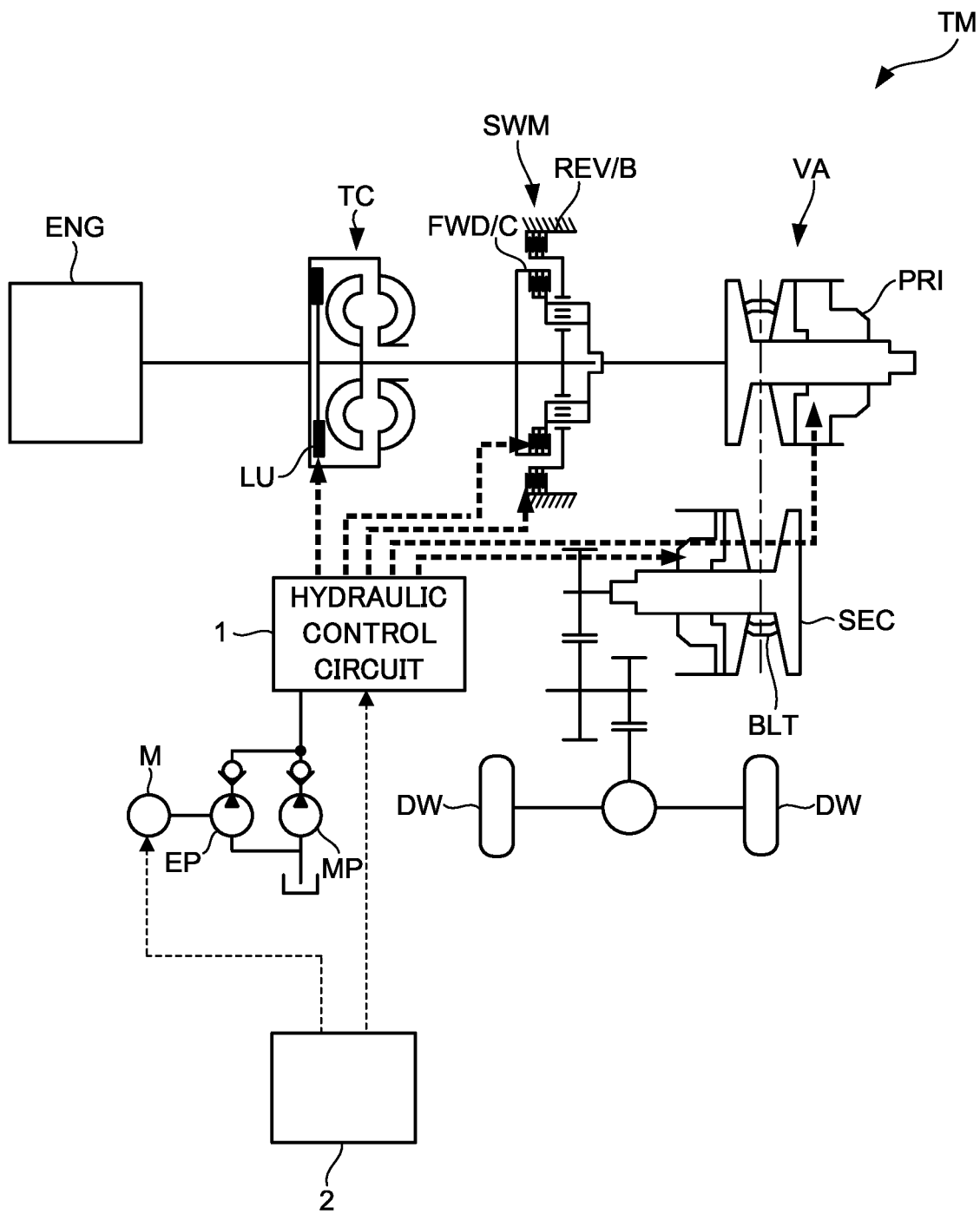
FIG. 1 is a schematic configuration diagram of a vehicle.

FIG. 1 is a schematic configuration diagram of a vehicle. The vehicle includes an engine ENG, a torque converter TC, a forward/reverse switching mechanism SWM, and a variator VA. In the vehicle, the transmission TM is a belt continuously variable transmission having a torque converter TC, a forward/reverse switching mechanism SWM, and a variator VA.

The engine ENG forms a driving source of the vehicle. Motive power of the engine ENG is transmitted to driving wheels DW via the torque converter TC, the forward/reverse switching mechanism SWM, and the variator VA. In other words, the torque converter TC, the forward/reverse switching mechanism SWM, and the variator VA are provided on a power transmission path connecting the engine ENG and the driving wheels DW.

The torque converter TC transmits the motive power via fluid. In the torque converter TC, the power transmission efficiency is improved by engaging a lock-up clutch LU.

The forward/reverse switching mechanism SWM is provided on the power transmission path connecting the engine ENG and the variator VA. The forward/reverse switching mechanism SWM switches a forward/reverse movement of the vehicle by switching a rotation direction of an input rotation. The forward/reverse switching mechanism SWM includes a forward clutch FWD/C, which is engaged when a forward range is selected, and a reverse brake REV/B, which is engaged when a reverse range is selected. When the forward clutch FWD/C and the reverse brake REV/B are disengaged, the transmission TM is put into a neutral state, that is, a power shut-off state.

The variator VA forms a belt continuously variable transmission mechanism including a primary pulley PRI, a secondary pulley SEC, and a belt BLT looped over the primary pulley PRI and the secondary pulley SEC. A primary pulley pressure Ppri, which is a hydraulic pressure of the primary pulley PRI, is supplied to the primary pulley PRI, and a secondary pulley pressure Psec, which is a hydraulic pressure of the secondary pulley SEC, is supplied to the secondary pulley SEC, respectively from a hydraulic control circuit 1 which will be described later.

The transmission TM is configured to further include a mechanical oil pump MP, an electric oil pump EP, and a motor M. The mechanical oil pump MP pumps oil to the hydraulic control circuit 1. The mechanical oil pump MP is driven by the motive power from the engine ENG. The electric oil pump EP pumps oil to the hydraulic control circuit 1 together with the mechanical oil pump MP or independently. The electric oil pump EP is provided as an auxiliary to the mechanical oil pump MP. The motor M drives the electric oil pump EP. It may be understood that the electric oil pump EP is configured to include the motor M.

The transmission TM is configured to further include the hydraulic control circuit 1 and a transmission controller 2. The hydraulic control circuit 1 is formed by a plurality of flow paths and a plurality of hydraulic control valves, and regulates the pressure of the oil supplied from the mechanical oil pump MP and the electric oil pump EP and supplies the regulated oil to each portion of the transmission TM.

The transmission controller 2 is a controller for controlling the transmission TM, and controls the hydraulic control circuit 1 and the electric oil pump EP according to a signal input from various sensors and the like. The hydraulic control circuit 1 performs hydraulic control for the lock-up clutch LU, the forward clutch FWD/C, the reverse brake REV/B, the primary pulley PRI, the secondary pulley SEC, and the like, according to instructions from the transmission controller 2.

Figure 2:
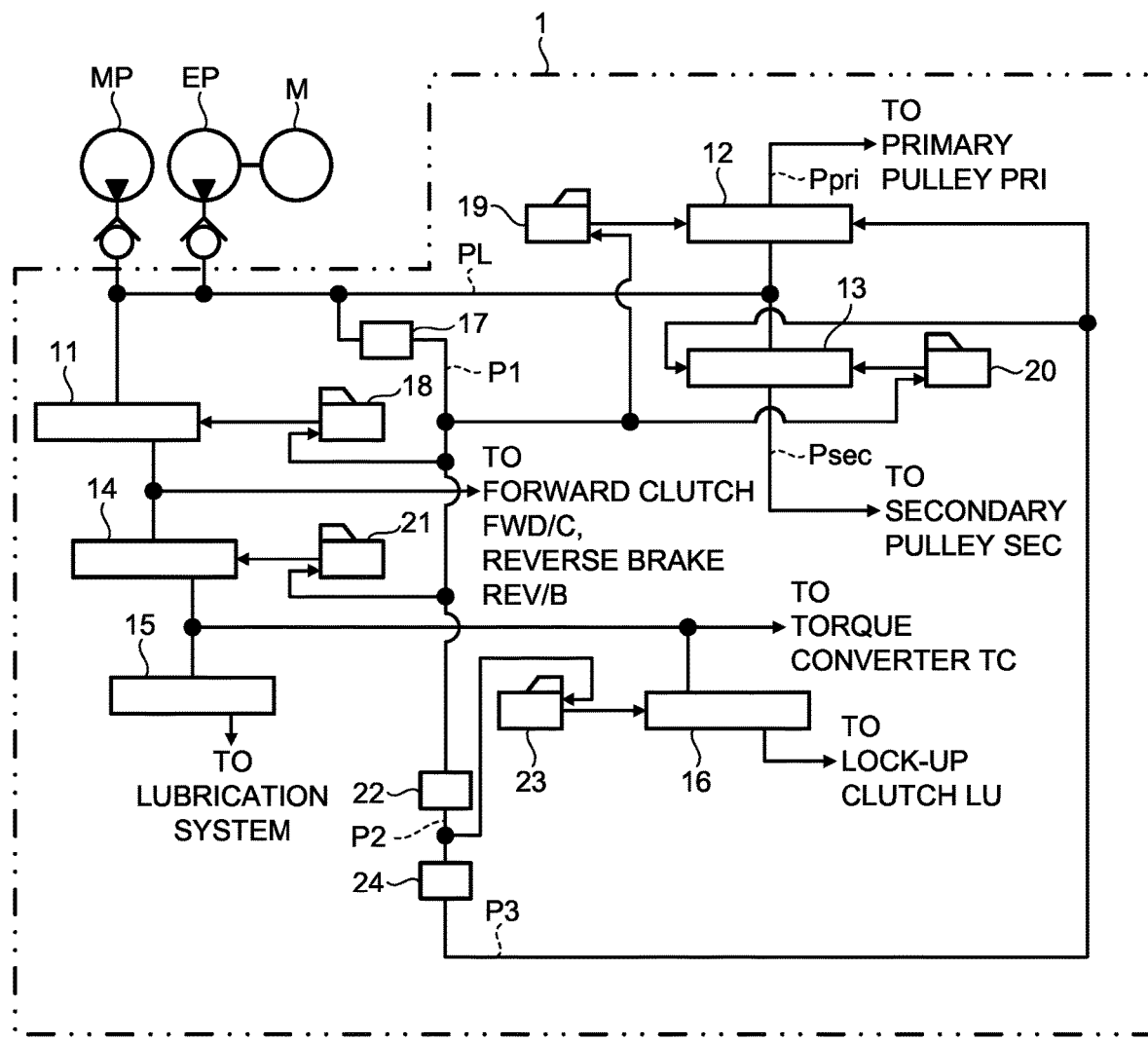
FIG. 2 is a schematic configuration diagram of a hydraulic control circuit.

FIG. 2 is a schematic configuration diagram of the hydraulic control circuit 1. The hydraulic control circuit 1 includes a pressure regulator valve 11, a primary regulator valve 12, a secondary regulator valve 13, a clutch regulator valve 14, a torque converter regulator valve 15, a lock-up regulator valve 16, a first pilot valve 17, a line pressure solenoid valve 18, a primary solenoid valve 19, a secondary solenoid valve 20, a clutch pressure solenoid valve 21, a second pilot valve 22, a lock-up solenoid valve 23, and a third pilot valve 24.

The pressure regulator valve 11 regulates the pressure of the oil discharged from at least one of the mechanical oil pump MP and the electric oil pump EP to a line pressure PL. Dashed lines indicating the line pressure PL indicates not an oil passage but an oil pressure. The pressure regulator valve 11 regulates the pressure of the oil discharged from the oil pump while draining a part of the oil. The oil regulated to the line pressure PL is supplied to the primary regulator valve 12, the secondary regulator valve 13, and the first pilot valve 17.

The primary regulator valve 12 and the secondary regulator valve 13 are pulley pressure control valves, which control a pulley pressure by regulating the pressure of the oil regulated to the line pressure PL to the pulley pressure. The pulley pressure is the primary pulley pressure Ppri in the case of the primary regulator valve 12, and is the secondary pulley pressure Psec in the case of the secondary regulator valve 13.

The oil drained from the pressure regulator valve 11 is supplied to the clutch regulator valve 14. The clutch regulator valve 14 regulates the pressure of the oil drained from the pressure regulator valve 11 to a clutch pressure. The oil regulated to the clutch pressure is selectively supplied to one of the forward clutch FWD/C and the reverse brake REV/B. The clutch regulator valve 14 regulates the pressure of the oil while draining a part of the oil.

The oil drained from the clutch regulator valve 14 is supplied to the torque converter regulator valve 15. The torque converter regulator valve 15 regulates the pressure of the oil drained from the pressure regulator valve 11 to a converter pressure of the torque converter TC. The torque converter regulator valve 15 regulates the pressure of the oil while draining a part of the oil, and the drained oil is supplied to the lubrication system of the transmission TM. The oil regulated to the converter pressure is supplied to the torque converter TC and the lock-up regulator valve 16.

The lock-up regulator valve 16 regulates the pressure of the oil regulated to the converter pressure to a lock-up pressure. The lock-up clutch LU is lock-up controlled by a lock-up differential pressure, which is a differential pressure between the converter pressure and the lock-up pressure. The oil regulated to the lock-up pressure is supplied to the lock-up clutch LU.

The pressure regulator valve 11 regulates the pressure of the oil according to a signal pressure generated by the line pressure solenoid valve 18. The same applies to the primary regulator valve 12 and the primary solenoid valve 19, the secondary regulator valve 13 and the secondary solenoid valve 20, the clutch regulator valve 14 and the clutch pressure solenoid valve 21, and the lock-up regulator valve 16 and the lock-up solenoid valve 23.

A first pilot pressure P1 is introduced as a source pressure into each of the line pressure solenoid valve 18, the primary solenoid valve 19, the secondary solenoid valve 20, and the clutch pressure solenoid valve 21. The first pilot pressure P1 is generated by the first pilot valve 17 with the line pressure PL as a source pressure. The first pilot pressure P1 is also introduced into the second pilot valve 22.

The second pilot valve 22 generates a second pilot pressure P2 with the first pilot pressure P1 as a source pressure. The second pilot pressure P2 is set equal to or higher than the lower limit of a set range of the line pressure PL. The second pilot pressure P2 is preset in consideration of controllability of the lock-up clutch LU. The second pilot pressure P2 is introduced into the lock-up solenoid valve 23 and the third pilot valve 24.

The lock-up solenoid valve 23 generates a lock-up signal pressure with the second pilot pressure P2 as a source pressure. The lock-up signal pressure is a signal pressure generated by the lock-up solenoid valve 23 in order to control the lock-up pressure of the lock-up clutch LU of the torque converter TC.

The third pilot valve 24 generates a third pilot pressure P3 with the second pilot pressure P2 as a source pressure. The third pilot pressure P3 is set lower than the lower limit of the set range of the line pressure PL. The third pilot pressure P3 is preset in consideration of damping performance of the primary regulator valve 12 and the secondary regulator valve 13. The third pilot pressure P3 is introduced into the primary regulator valve 12 and the secondary regulator valve 13 as a damping pressure.

The third pilot pressure P3 introduced as the damping pressure is introduced into the primary regulator valve 12 in an opposite direction of a primary signal pressure. The primary signal pressure is a signal pressure generated by the primary solenoid valve 19 to control the primary pulley pressure Ppri.

Similarly, the third pilot pressure P3 introduced as the damping pressure is introduced into the secondary regulator valve 13 in an opposite direction of a secondary signal pressure. The secondary signal pressure is a signal pressure generated by the secondary solenoid valve 20 to control the secondary pulley pressure Psec.

Next, major actions and effects of the present embodiment will be described.

Here, if the second pilot pressure P2 is introduced into the primary regulator valve 12 and the secondary regulator valve 13 as the damping pressure, the second pilot pressure P2 can be made to function as the source pressure of the lock-up solenoid valve 23 and function as the damping pressure of the primary regulator valve 12 and the secondary regulator valve 13, and the third pilot valve 24 becomes unnecessary.

However, in this case, when the second pilot pressure P2 is high, it is necessary to strengthen a spring that urges a spool against an acting force generated by the damping pressure in each of the primary regulator valve 12 and the secondary regulator valve 13. However, the hydraulic control circuit 1 has strict layout restrictions, making it difficult to configure such a spring. Therefore, in this case, it is necessary to lower the second pilot pressure P2.

On the other hand, in the lock-up solenoid valve 23, when the second pilot pressure P2 serving as the source pressure becomes lower, a use range of the lock-up signal pressure becomes narrower. Therefore, there is concern that too low setting of the second pilot pressure P2 may result in poor controllability of the lock-up clutch LU and cause occurrence of an engagement shock.

For these reasons, when the second pilot pressure P2 is intended to be lowered within a range where the controllability of the lock-up clutch LU does not deteriorate, the second pilot pressure P2 may be set equal to or higher than the lower limit of the set range of the line pressure PL.

The line pressure PL can be adjusted to the lower limit of the set range during high-speed traveling. When the line pressure PL becomes equal to or lower than the second pilot pressure P2 during high-speed traveling, the line pressure PL is output from the second pilot valve 22 as the second pilot pressure P2.

At this time, the lock-up clutch LU remains engaged. Therefore, when the line pressure PL equal to or lower than the second pilot pressure P2 is introduced into the lock-up solenoid valve 23 as the second pilot pressure P2, the controllability of the lock-up clutch LU is also not affected.

However, when the line pressure PL as the second pilot pressure P2 is introduced into the primary solenoid valve 19 and the secondary solenoid valve 20 as the damping pressure, oscillations in the line pressure PL becomes oscillations in the damping pressure. As a result, in this case, the primary pulley pressure Ppri and the secondary pulley pressure Psec may fluctuate.

(1) The hydraulic control circuit 1 according to the present embodiment corresponds to a damping pressure supply circuit for the pulley pressure control valve, and includes the pressure regulator valve 11, the first pilot valve 17, the second pilot valve 22, and the third pilot valve 24. The first pilot pressure P1 generated by the first pilot valve 17 is introduced as the source pressure into the primary solenoid valve 19 that generates the primary signal pressure and the secondary solenoid valve 20 that generates the secondary signal pressure. The second pilot pressure P2 generated by the second pilot valve 22 is introduced as the source pressure into the lock-up solenoid valve 23 that generates the lock-up signal pressure. The third pilot pressure P3 generated by the third pilot valve 24 is introduced as the damping pressure into the primary regulator valve 12 that controls the primary pulley pressure Ppri according to the primary signal pressure, and into the secondary regulator valve 13 that controls the secondary pulley pressure Psec according to the secondary signal pressure.

According to such a configuration, the third pilot pressure P3 is generated by using the second pilot pressure P2, which is made to function as the source pressure of the lock-up solenoid valve 23, as the source pressure, and the third pilot pressure P3 is made to function as the damping pressure of the primary regulator valve 12 and the secondary regulator valve 13.

Therefore, according to such a configuration, it is possible to set the third pilot pressure P3 to be lower than the lower limit of the set range of the line pressure PL while setting the second pilot pressure P2 to an appropriate level. Therefore, the controllability of the lock-up clutch LU and the damping performance of the primary regulator valve 12 and the secondary regulator valve 13 can be ensured.

(2) In the hydraulic control circuit 1, the third pilot pressure P3 is introduced into the primary regulator valve 12 in the opposite direction of the primary signal pressure, and is introduced into the secondary regulator valve 13 in the opposite direction of the secondary signal pressure.

According to such a configuration, the third pilot pressure P3 can appropriately function as the damping pressure.

(3) In the hydraulic control circuit 1, the second pilot pressure P2 is set to be equal to or higher than the lower limit of the set range of the line pressure PL, and the third pilot pressure P3 is set to be lower than the lower limit of the set range of the line pressure PL.

According to such a configuration, the controllability of the lock-up clutch LU and the damping performance of the primary regulator valve 12 and the secondary regulator valve 13 can be appropriately ensured in view of the fact that the primary pulley pressure Ppri and the secondary pulley pressure Psec may fluctuate when the second pilot pressure P2 is introduced as the damping pressure of the primary regulator valve 12 and the secondary regulator valve 13.

Although the embodiments of the present invention have been described above, the above-mentioned embodiments are merely illustrations of parts of application examples of the present invention, and there is no intention to limit the technical scope of the present invention to the specific configuration of the above-mentioned embodiments.

The present application claims a priority based on Japanese Patent Application No. 2020-183956 filed with the Japan Patent Office on Nov. 2, 2020, all the contents of which are hereby incorporated by reference.

DESCRIPTION OF REFERENCE SIGNS

1 Hydraulic control circuit (damping pressure supply circuit)
11 Pressure regulator valve
12 Primary regulator valve (primary pulley pressure control valve)
13 Secondary regulator valve (secondary pulley pressure control valve)
17 First pilot valve
19 Primary solenoid valve
20 Secondary solenoid valve
23 Lock-up solenoid valve
22 Second pilot valve
24 Third pilot valve
EP Mechanical oil pump (oil pump)
LU Lock-up clutch
MP Electric oil pump (oil pump)
TC Torque converter
TM Transmission (belt continuously variable transmission)

The invention claimed is:

1. A damping pressure supply circuit for a pulley pressure control valve, comprising:
    a pressure regulator valve that regulates a pressure of oil discharged from an oil pump to a line pressure;
    a first pilot valve that generates a first pilot pressure with the line pressure as a source pressure;
    a second pilot valve that generates a second pilot pressure with the first pilot pressure as a source pressure; and
    a third pilot valve that generates a third pilot pressure with the second pilot pressure as a source pressure, wherein
    the first pilot pressure is introduced as a source pressure into a primary solenoid valve that generates a primary signal pressure that is a signal pressure for controlling a primary pulley pressure in a belt continuously variable transmission and a secondary solenoid valve that generates a secondary signal pressure that is a signal pressure for controlling a secondary pulley pressure in the belt continuously variable transmission,
    the second pilot pressure is introduced as a source pressure into a lock-up solenoid valve that generates a signal pressure for controlling a lock-up pressure in a lock-up clutch of a torque converter, and
    the third pilot pressure is introduced as a damping pressure into a primary pulley pressure control valve that controls the primary pulley pressure according to the primary signal pressure and a secondary pulley pressure control valve that controls the secondary pulley pressure according to the secondary signal pressure.

2. The damping pressure supply circuit of the pulley pressure control valve according to claim 1, wherein
    the third pilot pressure is introduced into the primary pulley pressure control valve in an opposite direction of the primary signal pressure, and is introduced into the secondary pulley pressure control valve in an opposite direction of the secondary signal pressure.

3. The damping pressure supply circuit of the pulley pressure control valve according to claim 1, wherein
    the second pilot pressure is set to be equal to or higher than a lower limit of a set range of the line pressure, and
    the third pilot pressure is set to be lower than the lower limit of the set range of the line pressure.

* * * * *